United States Patent

Enger et al.

[11] Patent Number: 5,845,944
[45] Date of Patent: Dec. 8, 1998

[54] COUPLING FOR PRESSURIZED MEDIUM

[75] Inventors: Jens Olav Enger; Kjell Villanger, both of Raufoss, Norway

[73] Assignee: Raufoss Technology A/S, Raufoss, Norway

[21] Appl. No.: 849,549

[22] PCT Filed: Sep. 27, 1996

[86] PCT No.: PCT/NO96/00230

§ 371 Date: Aug. 19, 1997

§ 102(e) Date: Aug. 19, 1997

[87] PCT Pub. No.: WO97/13094

PCT Pub. Date: Apr. 10, 1997

[30] Foreign Application Priority Data

Oct. 3, 1995 [NO] Norway .................................... 953921

[51] Int. Cl.[6] .................................................. F16L 55/00
[52] U.S. Cl. ............................ 285/23; 285/276; 285/321; 285/351
[58] Field of Search .................................. 285/321, 924, 285/276, 23, 351

[56] References Cited

U.S. PATENT DOCUMENTS

| | | |
|---|---|---|
| 2,511,386 | 6/1950 | Warren ................................. 285/276 X |
| 3,574,359 | 4/1971 | Klein . |
| 3,584,902 | 6/1971 | Vyse ..................................... 285/924 X |
| 3,929,357 | 12/1975 | DeVincent et al. ................. 285/924 X |
| 4,707,000 | 11/1987 | Torgardh .............................. 285/924 X |
| 4,783,100 | 11/1988 | Klein . |

FOREIGN PATENT DOCUMENTS

| | | |
|---|---|---|
| 0 226 689 | 7/1987 | European Pat. Off. . |
| 2 540 965 | 8/1984 | France . |

*Primary Examiner*—Dave W. Arola
*Attorney, Agent, or Firm*—Sterne, Kessler, Goldstein & Fox P.L.L.C.

[57] ABSTRACT

A coupling for pressurized medium comprising a stud member and a socket member, the stud member and the socket member are mutually locked together in a completely coupled position by a locking ring which engages with circumferential locking ring grooves in the stud and socket member, two sealing rings sealingly engage the stud member and socket member and the stud member and socket member have second grooves into which a safety ring is fitted, the second groove in the socket member has a larger axial extent than the safety ring so that when the locking ring is engaged in the locking ring grooves, the safety ring is not effective to retain the stud and socket members together but is only effective prior to the locking ring engaging the locking ring grooves when the stud and socket members are incompletely coupled together.

7 Claims, 2 Drawing Sheets

COUPLING FOR PRESSURIZED MEDIUM

The present invention relates to a coupling for pressurized medium, comprising a stud member and a socket member into which the stud member can be inserted axially, whereby the stud member and the socket member can be mutually locked in a completely coupled position by means of a locking ring which can be brought into engagement with an annular locking ring groove in the outer surface of the stud member and in the inner surface of the socket member, and the stud member and the socket member have circumferential contact surfaces and/or grooves for two sealing rings, while the socket member has two locking ring grooves.

Such a coupling permits mutual rotation of the stud member and the socket member.

A coupling of this type is known, having a locking ring which, when the stud member has been moved completely into place to its normal position in the socket member, is engaged in a locking ring groove in the stud member and the socket member, respectively, and keeps these together. In an embodiment the socket member has a single locking ring groove, which is so deep that it can completely contain the locking ring, while the stud member has two shallower locking ring grooves which can only partly contain the locking ring. In the case that the stud member and the socket member are incompletely coupled together and the locking ring is situated in the axially innermost locking ring groove in the stud member, the stud member and the socket member can be pushed completely together, in that the locking ring is forced completely into the groove in the socket member, because the axially innermost groove in the stud member is bevelled along the axially outermost side, and an axial mutual shifting of the stud member and the socket member is made possible, because the locking ring does not project into the axially innermost groove in the stud member. Thereby, the locking ring can snap into the axially outermost locking ring groove in the stud member and lock the stud member and the socket member in a completely coupled position. Thus, the locking ring permits that a locking between the stud member and the socket member can be achieved even when these are not moved completely together. In this condition a pressurized medium will not flow freely out between the stud member and the socket member, because some degree of sealing is maintained by the axially innermost sealing ring, while the axially outermost sealing ring is not in contact with the socket member. By "axially innermost" and "axially outermost" is meant relatively to the insertion mouth of the socket member. However, a leakage will occur which indicates that the stud member and the socket member are not completely coupled together. In another embodiment the stud member has only one locking ring groove, which is sufficiently deep for containing the locking ring, and the socket member has an axially innermost and an axially outermost locking ring groove. In order to permit moving of the locking ring from the axially outermost to the axially innermost locking ring groove, while the locking ring is situated in the locking ring groove in the stud member, the locking ring must be compressed into the groove in the stud member. In order to move the stud member and the socket member together to an incompletely coupled position the locking ring must, when fit into the socket member, be expanded in order to permit the passage of an external bevelled edge on the stud member. When the locking ring is fit on the stud member it must be compressed in order to pass an internal bevelled edge in the socket member. This expansion and compression, respectively, cause a relatively large resistance against insertion. This resistance decreases somewhat when the bevelled edge has passed the locking ring, whereupon the locking ring enters one of the locking ring grooves, without this being sensed by the operator as a change of the resistance.

When such a known coupling is incompletely coupled the locking ring must, depending on which embodiment is considered, be forced out of the locking ring groove in the socket member and thereupon be compressed into the axially outermost locking ring groove in the stud member, or it must be forced into the deep locking ring groove in the stud member and thereupon expand outwardly in the axially innermost locking ring groove in the socket member when the stud member and the socket member have been moved completely together axially. Thus, the locking in both of the positions is based on the same locking ring. Moreover, in said second embodiment, both of the sealing rings are situated axially outside of the locking ring, which then may be subjected to vibrations. If the locking ring gets out of engagement with the innermost groove in the socket, the locking ring must be able to expand outwardly in the outermost groove in order to prevent complete decoupling. This is not likely to occur if the stud member for instance is in an accelerating movement out of the socket member.

The present invention provides a coupling which permits a more secure locking, and which also can be sensed by the operator.

The coupling according to the invention is characterized in that a second circumferential ring groove in the stud member contains a safety ring, which can be brought into engagement with a separate groove in the socket member, said groove having a larger axial extension than the safety ring and is situated such that when the stud member and the socket member are in a normal coupled position, and the locking ring is in engagement with the locking ring grooves in the stud member and the socket member, the safety ring is in an axial distance from the axially outermost delimitation of its groove in the socket member.

Preferably the locking ring is situated between the two sealing rings. Thereby the sealing rings will prevent vibrations in the region of the locking ring.

During coupling together of the stud member and the socket member the locking ring will initially be moved freely into the socket member, whereupon it will be somewhat compressed by a rib which delimits the locking ring groove in the socket member. Prior to this compression the safety ring has come into engagement with its groove in the socket member, and thereby the stud member and the socket member are in an incompletely coupled position, locked by the safety ring, and the axially innermost sealing ring provides incomplete sealing. During the continued axial moving together of the stud member and the socket member the compressed locking ring is shifted along the rib in the socket member, and snaps out into its locking ring groove in the socket member, and during this moving together the safety ring is shifted in its groove in the socket member, as this groove has a larger axial length than the safety ring. The locking has now been taken over by the locking ring. If the locking ring comes out of engagement with its groove in the socket member, the safety ring is in a standby position for preventing complete decoupling, because the safety ring is situated in engagement with the corresponding grooves in the stud member and the socket member. Thus, the locking caused by the safety ring and the locking caused by the locking ring occurs independently of each other. Moreover, a distinct increase of the resistance against moving together takes place when the safety ring enters the groove in the socket member, because simultaneously a compression of at least one of the sealing rings starts.

The invention will in the following be explained more detailed, with reference to the accompanying drawing, which shows an example of a coupling according to the invention in which the socket member constitutes an elbow. It will be appreciated that the stud member and the socket member may be straight, that both of them may be elbows and that the socket member may be straight and the stud member may be an elbow, as this is of no importance to the essential features of the invention.

Figure 1:
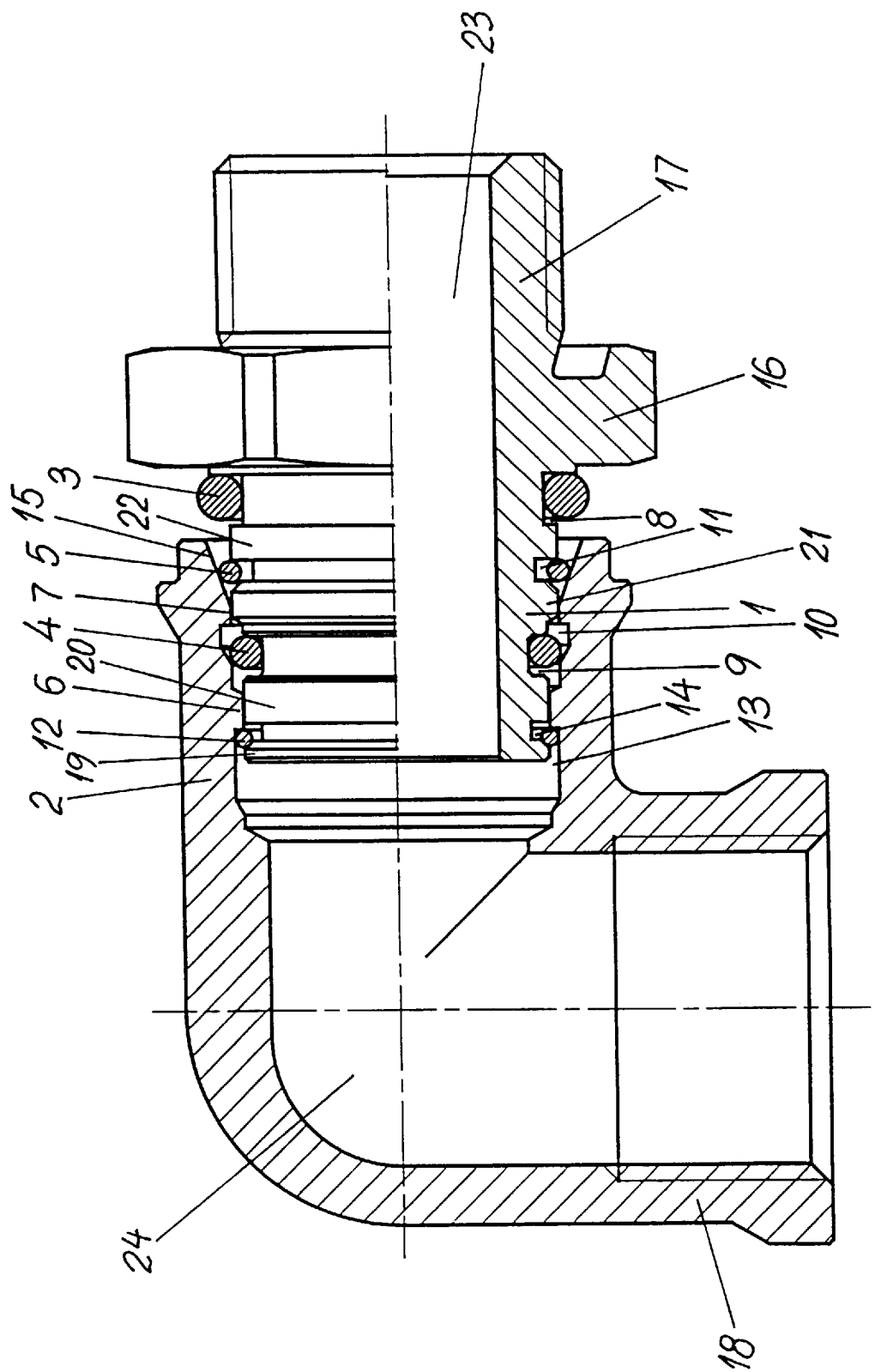
FIG. 1 shows a coupling according to the invention, in a longitudinal section, in a state where the stud member and the socket member are incompletely coupled together. The stud member is shown in section only in the lower half.

The FIGS. show a coupling comprising a stud member 1 and a socket member 2. The stud member may in a known manner have an exteriorly threaded elongation 17, and the socket member 2 may in a known manner have an interiorly threaded elongation 18, and it will be appreciated that these elongations may be differently threaded or consist of unthreaded studs, for instance for direct mounting of hoses. In addition the stud member is shown having a nut portion 16. Inside the stud member 1 and the socket member 2, respectively, is a flow passage, 23 and 24, respectively.

Two sealing rings 3 and 4, shown as O-rings, surround the stud member 1, in respective grooves 8, 9. The O-ring 3 contacts a bevelled surface 15 in the socket member 2, whereby the compression of the ring 3 increases during the last phase of moving together the stud member 1 and the socket member 2.

The stud member 1 has a circumferential groove 11 for a locking ring 5, and when the stud member 1 and the socket member 2 are completely interconnected (FIG. 2) the locking ring 15 is also situated in a circumferential groove 10 in the socket member 2, delimited by a circumferential rib 7, and the locking ring 5 is split and tends to expand from the condition shown in FIG. 1, in which the locking ring 5 is slightly compressed and is situated in the groove 11 in the stud member 1. The locking ring 5 may for instance have a radial or inclined slit, whereby it may be compressed from its relaxed condition, in which the ring 5 has such an external dimension that it can extend into the corresponding locking ring groove 10 in the socket member 2. Prior to the coupling together the locking ring 5 is fitted in its groove 11 in the stud member 1, and during the first phase of the interconnection of the stud member 1 and the socket member 2 the locking ring 5 will enter the bevelled surface 15 in the socket member 2 and be somewhat compressed. Thereupon the locking ring 5 will be compressed further in order to pass the rib 7 in the socket member 2, and finally the locking ring 5 snaps out into the groove 10 in the socket member 2, but it still extends into the groove 11 in the stud member 1.

Figure 2:
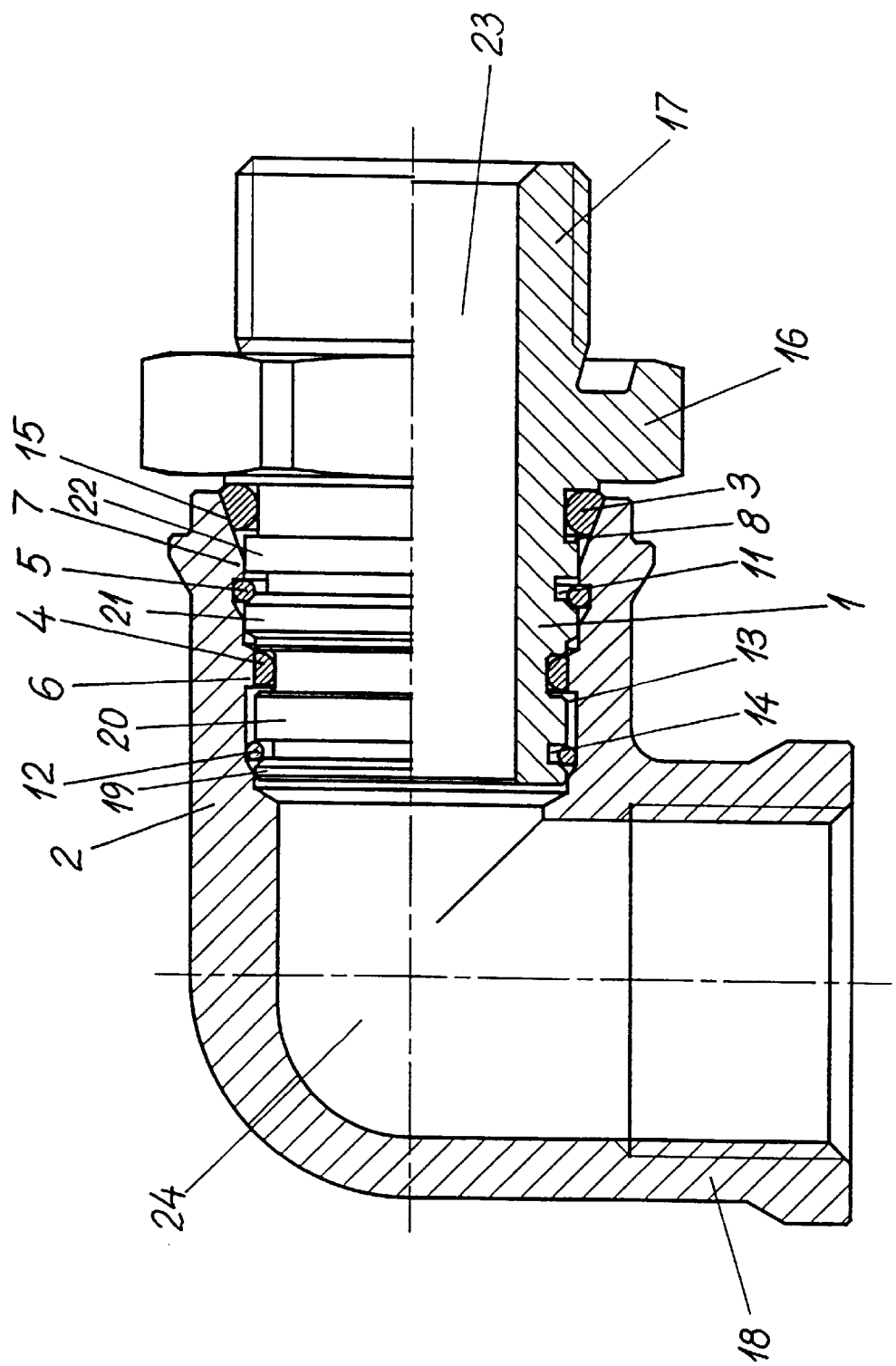
FIG. 2 shows, in a corresponding manner as FIG. 1, the coupling of FIG. 1 with the stud member and the socket member completely coupled together.

Axially innermost (relatively to the mouth of the socket member 2) on the stud member 1 a safety ring 12 is fitted in an annular groove 14. The safety ring 12 may have a radial or inclined slit, in order to be compressed from its relaxed condition, similarly as the locking ring 5. The stud member 1 has circumferential ribs 19, 20, 21 and 22 which delimit the grooves 8, 9, 11 and 14. When the stud member 1 and the socket member 2 are moved together the safety ring 12 is moved freely into the socket member 2 until it abuts a rib 6 which delimits a groove 13 for the safety ring 12 in the socket member 2. When the safety ring 12 abuts the rib 6 a small counter force against the insertion occurs, but only when the safety ring 12 has been inserted in the groove 13 and the sealing rings 3 and 4 abut the bevelled surface 15 and the rib 6, respectively, a larger resistance against further insertion will occur. Thus, it can be sensed, from the resistance, that the safety ring 12 has come into place in the groove 13. This is achieved by means of a suitable mutual location and dimensioning of the locking ring 5, the sealing rings 3 and 4 and the corresponding grooves, whereby, during the moving together of the stud member 1 and the socket member 2, mainly only a compression of the safety ring 12 takes place, in order that it may pass the rib 6 defining the axially outermost delimitation of the groove 13 for the safety ring 12. Somewhat prior to the expansion of the safety ring 12 into the groove 13 in the socket member 2, or approximately simultaneously therewith, the locking ring 5 abuts the bevelled surface 15 in the socket member 2, and approximately simultaneously, or somewhat later, the sealing ring 3 abuts the rib 7 delimited by the bevelled surface 15, and the sealing ring 4 abuts the rib 6 delimiting the groove 13 in the socket member 2. In this condition the stud member 1 and the socket member 2 are mutually locked by the safety ring 12, which is permanently fitted in the groove 14 in the stud member 1 and which has expanded into the circumferential groove 13 in the socket member having a larger axial extension than the safety ring 12. When the stud member 1 and the socket member 2 have been moved incompletely together (FIG. 1) the safety ring 12 is situated at the axially outermost delimitation of the groove 13, and prevents that the stud member 1 and the socket member 2 can be pulled away from each other immediately. Upon a further moving together against an increasing resistance due to the sealing rings the locking ring 5 comes into engagement with the groove 10 in the socket member 2, and the safety ring 12 is then situated in a distance from the axially outermost delimitation of its groove 13 in the socket member 2, as shown in FIG. 2. The ring 12 is also shown in a certain distance from the axially innermost delimitation of the groove, but this distance is of no importance.

The ring 12 is situated closer to the free end of the stud member 1 than the locking ring 5 and the two sealing rings 3 and 4.

The coupling according to the invention permits mutual rotation of the stud member 1 and the socket member 2. The flexing safety ring 12 has the effect that the stud member 1 and the socket member 2 by being moved together initially reach a position where the safety ring 12 keeps the parts together, in which position the parts are incompletely interconnected, whereupon continued moving together of the parts causes that the flexing locking ring 5 becomes effective.

What is claimed is:

1. Coupling for pressurized medium, comprising:

a stud member;

a socket member in which the stud member is inserted axially;

a locking ring which is brought into engagement with a first annular locking ring groove in an outer surface of the stud member and a first annular locking ring groove in an inner surface of the socket member for locking the stud member and the socket member;

wherein the stud member has two circumferential contact surfaces containing two sealing rings, the socket member has two circumferential contact surfaces for the two sealing rings, the socket member has a second locking ring groove, the stud member has a second locking ring groove containing a safety ring which is brought into engagement with the second locking ring groove in the socket member, said second locking ring groove in the socket member having a larger axial extension than the safety ring and being axially situated such that when the first annular locking ring is in engagement with the corresponding first annular locking ring grooves in the stud member and the socket member, the safety ring is situated an axial distance from the axially outermost delimitation of the second locking ring groove in the socket member.

2. Coupling as defined in claim 1, wherein the safety ring and the second locking ring groove in the stud member are situated axially inside of the locking ring and the sealing rings relative to a mouth of the socket member.

3. Coupling as defined in claim 2, wherein the locking ring is situated axially between the sealing rings.

4. Coupling as defined in claim 2, wherein the location and the dimensions of the stud member, the socket member, the locking ring, the sealing rings and the safety ring are such that the safety ring can be moved approximately to the second locking ring groove in the socket member without exertion of any substantial resistance against the moving together of the stud member and the socket member by the locking ring or the sealing rings.

5. Coupling as defined in claim 1, wherein the locking ring is situated axially between the sealing rings.

6. Coupling as defined in claim 5, wherein the location and the dimensions of the stud member, the socket member, the locking ring, the sealing rings and the safety rings are such that the safety ring can be moved approximately to the second locking ring groove in the socket member without exertion of any substantial resistance against the moving together of the stud member and the socket member by the locking ring or the sealing rings.

7. Coupling as defined in claim 1, wherein the location and the dimensions of the stud member, the socket member, the locking ring, the sealing rings and the safety ring are such that the safety ring can be moved approximately to the second locking ring groove in the socket member without exertion of any substantial resistance against the moving together of the stud member and the socket member by the locking ring or the sealing rings.

* * * * *